United States Patent [19]

Jacquemet

[11] Patent Number: 5,716,694
[45] Date of Patent: Feb. 10, 1998

[54] PANE OF LAMINATED GLASS AND METHOD FOR MANUFACTURING SUCH A PANE OF GLASS

[75] Inventor: Francois Jacquemet, Vieux Moulin, France

[73] Assignee: Saint Gobain Vitrage, Courbevoie, France

[21] Appl. No.: 648,440

[22] Filed: May 15, 1996

[30] Foreign Application Priority Data

May 15, 1995 [FR] France ................................. 95 05713

[51] Int. Cl.⁶ ........................................................ B32B 9/00
[52] U.S. Cl. ............................ 428/192; 428/38; 428/46; 428/246; 428/410; 428/425.6; 428/426; 428/432; 296/84.1; 156/99; 65/102; 52/208; 52/308
[58] Field of Search ................................ 428/246, 38, 192, 428/426, 46, 410, 425.6, 432; 52/308, 208; 156/99; 65/102; 296/84.1

[56] References Cited

FOREIGN PATENT DOCUMENTS

| | | |
|---|---|---|
| 1 305 847 | 8/1962 | France . |
| 576095 | 3/1946 | United Kingdom . |
| 1193267 | 5/1970 | United Kingdom . |
| 2219822 | 12/1989 | United Kingdom . |

*Primary Examiner*—Patrick Ryan
*Assistant Examiner*—Abraham Bahta
*Attorney, Agent, or Firm*—Oblon, Spivak, McClelland, Maier & Neustadt, P.C.

[57] ABSTRACT

A pane of glass composed of at least two sheets of glass 2,3 and of at least one insert layer 7. The surface-area of one of the sheets of glass is smaller than that of the other sheet, the edges of the two sheets lying flush at least at part of the periphery and the edge of the sheet of glass having the smaller surface-area not overhanging the large sheet of glass at any point.

12 Claims, 2 Drawing Sheets

PANE OF LAMINATED GLASS AND METHOD FOR MANUFACTURING SUCH A PANE OF GLASS

BACKGROUND OF THE INVENTION

1. Field of the Invention

The invention relates to a new pane of safety glass, intended especially to be used as a windscreen for motor vehicles.

The description which follows will deal with the case of windscreens for vehicles but it goes without saying that the invention can just as easily relate to panes of safety glass intended to be mounted in any vehicle or building opening; it may especially be a motor vehicle rear screen which may have a heater.

2. Description of the Related Art

The windscreens currently used are panes of safety glass known as "laminated", that is to say ones formed of two or more sheets of glass bonded together by one or more plastic insert sheets, this insert layer generally being a sheet of polyvinyl butyral.

The usual techniques for manufacturing a laminated windscreen consist firstly in bending the two sheets of glass into the desired shape. For that, the two sheets of glass are superimposed so that they can be bent simultaneously, for example under gravity, on a bending frame which will be conveyed through a tunnel furnace. The sheets of glass are coated on their contacting faces with a non-stick product to prevent any risk of them breaking during bending. Prior to this, the two sheets of glass were cut and shaped to the desired dimensions. The dimensions of the sheet intended to be oriented towards the inside of the passenger compartment are usually smaller than those of the outer sheet so that the edges of the two sheets of glass lie flush after bending.

Next, the sheets of glass are washed then dried to remove the non-stick product. During the next step, termed the assembly step, the sheets of glass are repositioned one on the other, these being separated by an insert sheet of the PVB (polyvinyl butyral) type.

When positioned, the PVB is in the form of one or more sheets with larger dimensions than the sheets of glass. During the assembly step it is necessary to cut the PVB to the size of the sheets of glass; this is the "trimming up" step. After this step comes the "pre-pressing" step; the sheets of glass are pressed together either by mechanical tools, or by the creation of a vacuum, at a temperature above ambient temperature. Next, in a definitive assembly step, the pane of glass is put in an autoclave and is subjected to a pressure of approximately 10 bar and a temperature of the order of 130° C.

A pane of laminated glass known as safety glass is thus produced. However, the pane of glass thus produced still requires a finishing step because PVB, like the other plastics that can be used for this application, shrinks during the manufacture of the pane of laminated glass, especially following a rise in temperature.

Moreover, these plastics are known for their moisture sensitivity. It is therefore preferable for the pane of laminated glass not to have, around the periphery between the two sheets of glass, a gap like a channel which may lead to water being retained and therefore to adverse changes in the insert layer. These adverse changes in the insert layer are generally manifested in delamination thereof and/or in the appearance of "cloudiness" or haze which distorts the view through the glass.

In order to avoid this problem, provision is made at the trimming-up stage, for cutting the insert layer so that its dimensions remain slightly greater than those of the sheets of glass. In this way, during the PVB shrinkage phenomenon, no gap is created between the two sheets of glass. By contrast, the shrinkage leads to the formation of a wad of PVB on the outer edges of the pane of glass. This technique leads to different drawbacks. First of all, in order to carry out the trimming-up operation while providing a slight overhang of the insert sheet, it is necessary to provide a manual step which can be entrusted only co an experienced worker with good dexterity so that the insert sheet is not cut flush with the sheets of glass.

In addition, as was stated earlier, it is necessary to provide a finishing step. This is because the presence of the wad which is formed at the periphery of the pane of glass upsets the fitting of the mounting seal which is designed to cover just a small area of the pane of glass. In addition, the dimensions of the wad are random and non-uniform around the periphery of the pane. It is therefore impossible to meet the dimensional tolerances on the pane of glass. It is therefore necessary to remove this wad in a finishing step known as a "deburring" step. This step usually consists in softening this wad by heating, then in cutting it off.

The inventors have set themselves the task of producing a pane of laminated glass for which the finishing step is not necessary.

Already described in document EP 0,121,479 is the production of a pane of laminated glass avoiding such a step. For that, it is proposed to superimpose two sheets of glass, one of which has smaller dimensions, these being separated from one another by an insert layer cut a priori to the dimensions of the small sheet of glass. When this pane of glass is assembled, the insert layer undergoes a phenomenon of shrinkage and a channel is therefore formed at the periphery of the small sheet of glass. In order to avoid the risks of water damage, provision is made for fitting a strip which covers this channel and which can be used for mounting the pane of glass in a bodywork opening. The strip is arranged so that it is supported by those regions of the large sheet which are not covered by the small sheet of glass.

The finishing step which is usual in the manufacture of a pane of laminated glass is effectively eliminated. However, it has been replaced by another step consisting in fitting the strip. What is more, this document does not specify the means employed for centring the sheets of glass with respect to each other so that the large sheet overhangs uniformly over the periphery to take the strip. Such a method can be achieved only by means which are relatively difficult to implement and therefore expensive and additionally require a slower step for carrying out this centring.

SUMMARY OF THE INVENTION

The object of the invention is therefore a pane of laminated glass which does not require any finishing step in producing it, or and other step as substitute for this finishing step. Another object of the invention is to be able to produce such a pane of glass using the conventional laminated glass manufacturing techniques and the manufacturing tools without having to modify them completely.

These objectives are achieved according to the invention by a pane of laminated glass composed of at least two sheets of glass and of at least one insert sheet, the surface-area of one of the sheets of glass being smaller than that of the other sheet of glass and such that the edges of the two sheets of glass lie flush at least at part of the periphery and that the edge of the sheet of glass having the smaller surface-area does not at any point overhang the large sheet of glass.

It is thus possible, when producing such a pane of glass, to eliminate the finishing step which consists in cutting off the wad formed by the insert layer at the periphery. In effect, it is possible to cut the insert layer to the dimensions of the large sheet of glass. In this way, after the PVB has shrunk, the wad is formed in the region of offset between the two glasses and therefore rests on the large glass. It is therefore unnecessary to remove this wad which does not hamper the fitting of the mounting seal.

Moreover, a shrinkage of the insert layer between the two sheets of glass and therefore the formation of a gap may occur at the peripheral regions where the sheets of glass lie flush. However, such a gap is highly localized and its dimensions correspond to those of one of the said peripheral regions advantageously produced with dimensions which do not allow it to become like a channel. The formation of such highly localized gaps therefore leads to no risk of water retention which would be harmful to the insert layer.

Another advantage of the invention, apart from the fact that the finishing step is eliminated, is that of simplifying the trimming-up step. As was seen earlier with the conventional techniques, the insert layer is very tricky to cut because dimensions slightly greater than those of the sheets of glass have to be provided. According to the invention, this step is greatly simplified because the insert layer is cut to the size of the large sheet of glass; in particular, it is possible to rest against the large sheet of glass in order to carry out this cutting operation, which in particular makes it possible to envisage automating this step.

The pane of laminated glass according to the invention also poses no problems during its production when the two sheets of glass have to be positioned one with respect to the other. The presence of the regions on the small sheet of glass which lie flush with the edge of the large sheet of glass provides for this positioning.

Another feature of such a pane of glass is that it has a wad formed by the insert layer on the large sheet of glass in the region of offset between the two sheets of glass, the said wad not protruding beyond the periphery of the said sheet of glass.

According to an alternative form which is necessary especially when motor vehicle glass and more particularly windscreens are concerned, the sheet of laminated glass has a curvature in at least one direction. The sheet of glass having the smaller surface-area is positioned in the curvature and more exactly in the direction of the interior of the passenger compartment when the pane of glass is fixed in the opening of a vehicle. Correct positioning of the sheets of glass is therefore of prime importance during the bending phase.

In order to improve and to facilitate still further this positioning of the sheets of glass, the edges of the sheets of glass lie flush on at least part of the periphery on each side of the pane of glass.

As a preference, the sheet of glass having the smaller surface-area includes at least one "lug" or protrusion which forms part of the periphery lying flush with the edge of the other sheet of glass, and preferably has at least two lugs or protrusions on the lower side of the pane of glass.

A lug or protrusion is advantageously produced by forming a curve with two points of inflection at the periphery of a sheet of glass. Such a curve has radii of curvature which vary right along its length. In order to facilitate and not to modify the tools of current installations, the curves delineating the lugs advantageously have minima on the outside radii, that is to say those whose centre is placed inside the sheet of glass, of between 10 and 250 mm and minima of the inside radii, that is to say those whose centre is placed outside the sheet of glass, of between 60 and 300 mm.

Also as a preference, a lug has a length of between 10 and 40 mm, and preferably equal to 20 mm, and a width of between 1 and 4 mm, and preferably equal to 2 mm. The length is the distance measured parallel to the edge of the sheet of glass. The chosen length makes it possible not to create any channel in which water could settle. The width is measured perpendicular to the length and corresponds to the aforementioned offset between the two sheets of glass.

The invention also proposes a method for manufacturing such a pane of laminated glass. This method takes up the usual steps of manufacture given earlier, except of course for the finishing step and includes an amended trimming-up step, the insert sheet being cut to the dimensions of the sheet of glass having the larger surface-area.

BRIEF DESCRIPTION OF THE DRAWINGS

Other details and advantageous features will emerge below from one embodiment of a pane of glass according to the invention with reference to FIG. 1, 2, 3 and 4, which represent.

DETAILED DESCRIPTION OF THE PREFERRED EMBODIMENTS

FIGS. 1 to 4 are not reproduced to scale and reveal some details or features out of proportion so as to make the invention easier to understand.

Figure 1:
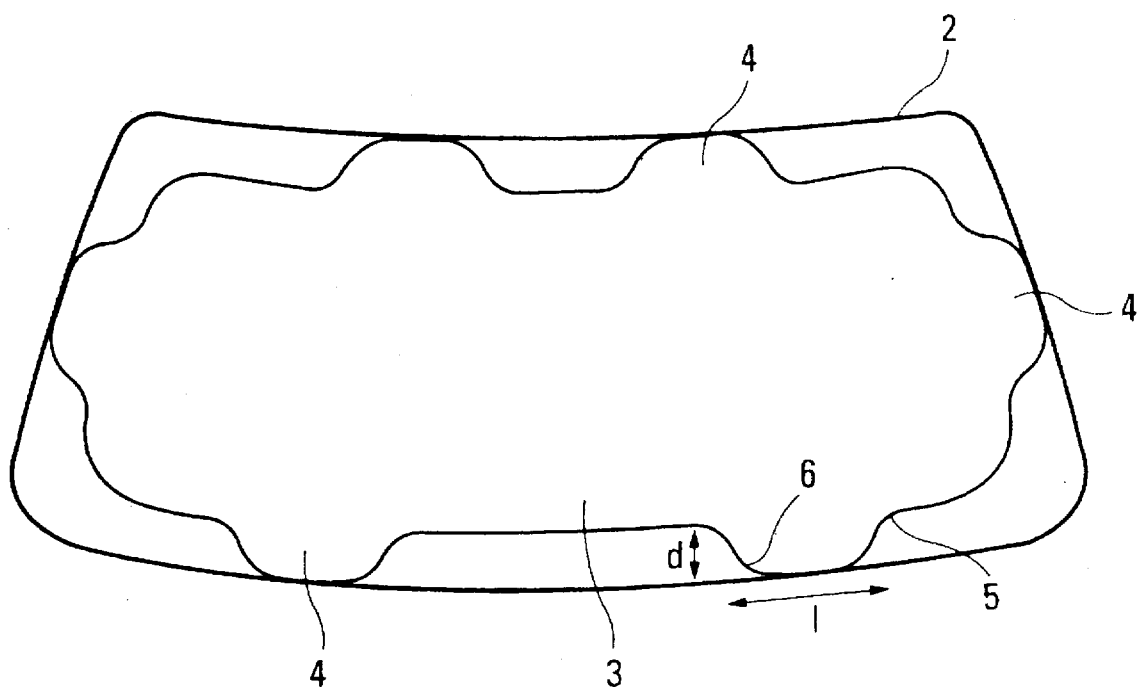
FIG. 1: a plan view of a pane of glass in the process of being made.
Figure 2:
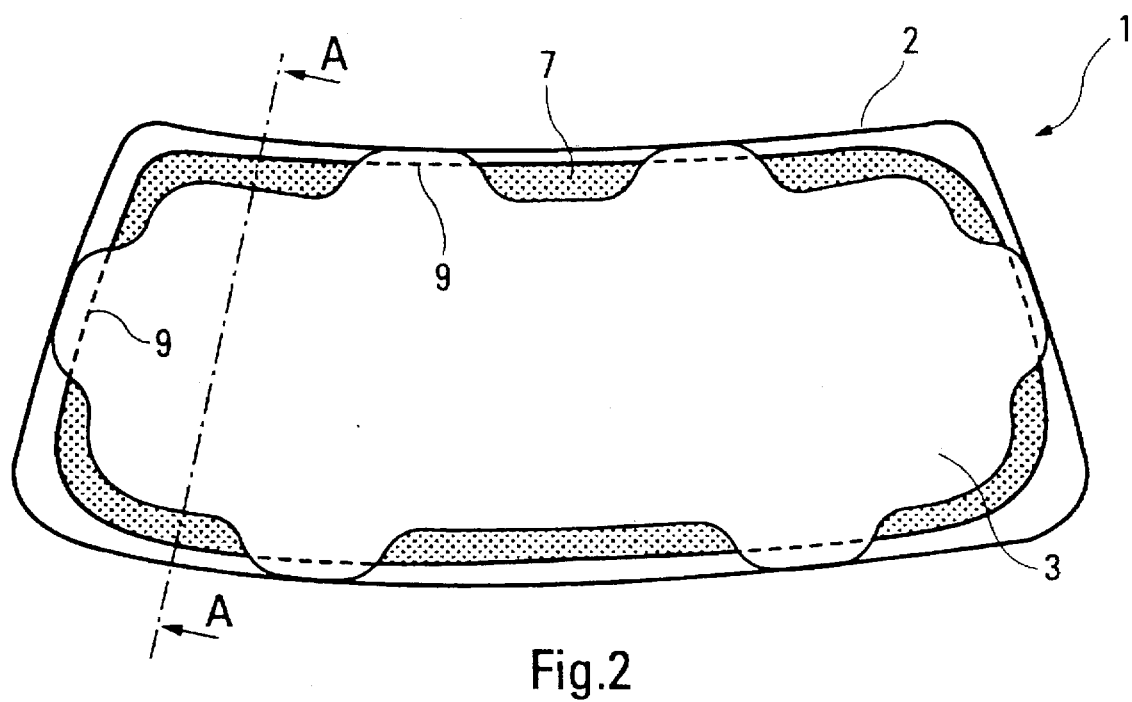
FIG. 2: a plan view of the same pane of glass, finished.

FIG. 1 represents a pane of glass 1 in the process of being made. This may especially be the assembly of two sheets of glass 2,3 as they are during the step of bending a windscreen. The two sheets of glass 2,3 are therefore superimposed before passing through a tunnel furnace where they are brought up to the bending temperature. In the usual techniques, provision is made for the sheet of glass 3 placed on top to be cut to slightly smaller dimensions than the lower sheet 2. That allows the edges of the two sheets to lie flush along their entire periphery after bending. According to the invention, this difference in dimensions of the sheets of glass which creates an offset of the periphery of one sheet of glass relative to that of the other sheet of glass is accentuated so that an offset is maintained after bending over practically the entire periphery. However, in certain regions, previously referred to as "lugs" 4, the edge of the sheet 3 lies flush with that of the sheet of glass 2. These regions or lugs 4 allow the sheets of glass to be centred one with respect to the other when the two sheets of glass are stacked at the beginning of the bending step. It is, in effect, important for the sheets to be correctly centred one with respect to the other before they are bent. In order to carry out this centring, use is made of stops, conventionally used for such operations, which are placed facing the lugs 4. These lugs also play an important part during the assembly step. In effect, when the sheets of glass are put in the autoclave, they are usually in an almost vertical position. The presence of lugs at the bottom of the sheet of glass 3 makes it possible to avoid any risk of this sheet of glass sliding, when assembly is not finished. The positioning and number of lugs are chosen as a function of the dimensions of the pane of glass to be produced. In the example of FIG. 1, the sheet of glass 3 has one lug on each of its short sides and two lugs on each of its long sides. This distribution makes it possible to distribute the forces symmetrically when centring. It would seem beneficial to provide at least two lugs on at least one long side to avoid any risk of the sheet 3 pivoting during centring. These two lugs are preferably at the bottom, also to eliminate any risks of the sheet 3 pivoting, this time under the effect of gravity when being placed in the autoclave.

The lugs 4 which are a modification in the peripheral cut-out of the sheet of glass 3 are made at the same time as the said sheet of glass 3 is cut-out. In order to achieve this, and with the concern that the tools habitually used for cutting out and shaping sheets of glass should not be modified, the dimensions of the lugs 4 are chosen so as to be produced without problem by these tools. These lugs 4 of rounded shapes in particular have curvatures 6 which have minima of the internal radii of between 60 and 300 mm and curvatures 5 having minima of the external radii of between 10 and 250 mm. The length "1" of a lug 4 is between 10 and 40 mm and chosen preferably to be equal to 20 mm. The width "d" of a lug 4 is between 1 and 4 mm and preferably equal to 2 mm. This width "d" of course corresponds to the offset which there is at the periphery between the two sheets of glass at the points where the lugs are not present.

Figure 3:
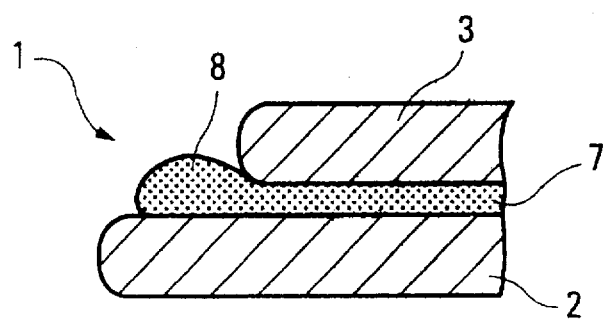
FIG. 3: a partial view in section on A—A of the pane of glass of FIG. 2.

Having finished the bending, the sheets of glass 2,3 are washed then dried, especially to remove the non-stick product mentioned earlier. Next comes the assembly step in which an insert sheet 7, such as PVB, is placed between the two sheets of glass 2,3. This sheet of PVB 7 initially has dimensions which are markedly greater than those of the sheets of glass. Next comes the trimming-up step which, according to the invention, consists in cutting the sheet of PVB 7 to the dimensions of the sheet of glass 2. Such a step may thus very simply be automated, by contrast with the habitual techniques which require a great deal of precision to obtain a cutting-out of the PVB which leads to dimensions slightly greater than those of the sheets of glass. Next, assembly is carried out, as discussed earlier. During the assembly, the insert sheet 7 undergoes a shrinkage phenomenon and forms a wad 8 at the periphery of the pane of glass. This wad 8 is represented in FIG. 3. This wad 8 rests on the sheet of glass 2 in the region of offset between the two sheets of glass. By contrast, a gap may be formed between the two sheets of glass at the lugs 4. This gap is symbolized by dotted lines 9 denoting the limit of the PVB insert sheet. In contrast with what happens when such a gap is formed around the entire periphery of the pane of glass, the presence of gaps obtained according to the invention has no risk with regard to moisture. This is because the dimensions of the lugs to which the gaps formed correspond are such that they do not allow water to settle. Adverse changes in the PVB due to the settling of water is thus avoided. A slight wad may also be formed at these lugs 4; however, in such a case, the removal of this slight wad is very simple and does not per se require an additional step.

Moreover, the wad 8 of PVB which is formed at the periphery of the pane of glass un the sheet of glass 2, does not in any way increase the dimensions of this pane. It is therefore possible to fit a mounting seal around the periphery of the pane of glass without the risk of seeing any deformation of this seal as would be the case when the wad overhangs the periphery of the pane of glass, according to the habitual manufacturing techniques.

The deburring step which is necessary according to current manufacturing techniques is thus unnecessary when manufacturing the pane of laminated glass 1 according to the invention.

Figure 4:
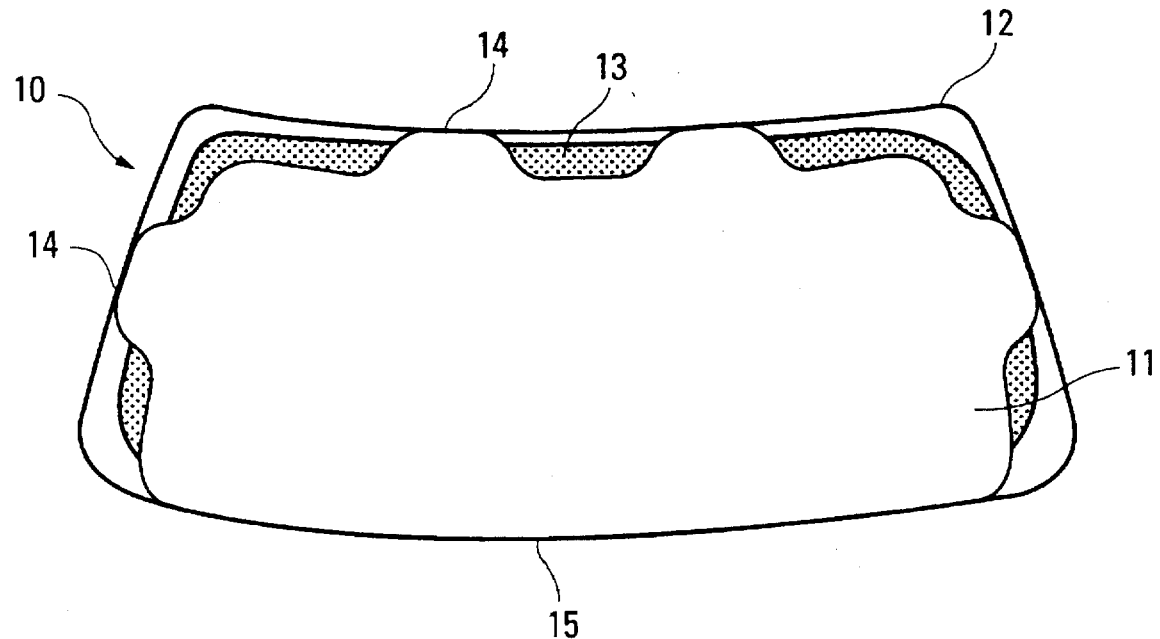
FIG. 4: a plan view of another pane of glass according to the invention.

FIG. 4 illustrates an alternative form of the invention. In this alternative form, the sheet of laminated glass 10 is still composed of two sheets of glass 11,12 separated by an insert sheet 13 of the PVB type. The sheet of glass 11 which, according to the invention, has the smaller surface-area has lugs 14 on three sides. The side 15 forming the bottom part of the pane of glass has no lugs; rather it lies flush along its entire length with the corresponding side of the sheet of glass 12. This embodiment makes the positioning of the sheet 11 on the sheet of glass 12 easier, especially during the assembly steps. What is more, a single lug 14 on one of the short sides of the sheet of glass 11 might be sufficient to centre the sheets of glass without any risk of rotation. Moreover, in accordance with the invention, during the trimming-out step the sheet of PVB 13 is cut to the dimensions of the large sheet of glass, except along the side 15. This is because as far as the pane of glass 10 of FIG. 4 is concerned it is possible to cut the PVB on the side 15 as is currently done, that is to say providing dimensions of the sheet of PVB which are slightly greater than those of the sheet of glass 12. In this way, after the PVB has shrunk, a wad is to be found on the outside of the pane of glass 10 along the length of the side 15. However, it is not necessary to provide a finishing step for removing it because the bottom of a windscreen is not generally covered by a mounting seal on its edge face; the wad of PVB is therefore no problem at this location. What is more, it is invisible because it is concealed by the bonnet of the vehicle.

The various panes of glass in accordance with the invention discussed earlier may be produced without the finishing step which habitually consists in removing the wad formed by the PVB at the periphery of the pane of glass. Moreover, the trimming-up step when manufacturing panes of glass according to the invention can usually be simplified and possibly automated quite simply, the insert sheet being cut to the dimensions of the larger sheet of glass.

Moreover, panes of glass according to the invention have other advantages. In particular, it is possible for functional elements to be partially inserted between the two sheets of glass without any risk that the protruding part of the functional element will be damaged because it does not overhang the periphery of the pane of glass. Such a functional element is, for example, a metal wire which may be used to convey current for powering, for example, a heater or alternatively a heating layer of a rear screen of a motor vehicle. A metal wire of this type may be placed on the face of the small sheet of glass in contact with the insert layer during the assembly step. The protruding end of the metal wire does not overhang the periphery of the pane of glass. In an alternative form, the protruding part of the metal wire may match the shape of the edge of the pane of glass and its end is bonded to the other face of the small sheet of glass. The protruding part of the metal wire is thus not at the periphery of the pane of glass but on the region of offset between the two sheets of glass. What is more, the wad of PVB which comes to rest against the edge of the small sheet of glass may protect this protruding part of the metal wire.

Another advantage, associated more particularly with the offset between the two sheets is that of being able to route a functional element, for example a wire, across this offset region, that is to say in contact with the wad. The presence of such a wire does not increase the bulk of the pane of glass and may, for example, allow an electrical connection at the periphery of the pane of glass to be shifted, for example, from one side to the other.

I claim:

1. A pane of laminated glass comprising:
   a first glass sheet;
   a second glass sheet having a surface area smaller than that of said first glass sheet; and
   at least one insert sheet positioned between said first and second glass sheets to form a laminated pane,
   wherein edges of said first and second glass sheets of the pane lie flush with one another over at least a part of the periphery of the pane on at least two opposite sides of the pane, and wherein the edge of the second glass sheet does not over hang the first glass sheet at any point of the periphery, so that said second glass sheet is centered with respect to said first glass sheet by use of said flush edges.

2. The pane of claim 1 wherein the insert sheet forms a wad at a portion of the first glass sheet which is not covered by said second glass sheet, said wad not protruding beyond the periphery of said first glass sheet.

3. The pane of claim 1 wherein the pane is curved in at least a portion having said second glass sheet.

4. The pane of claim 1 wherein the edges of said first and second glass sheets of the pane lying flush with one another are formed by lugs extending from said second glass sheet.

5. The pane of claim 4 wherein the pane has opposing longer sides and opposing shorter sides, and wherein at least one of the longer sides has two of said lugs.

6. The pane of claim 4 wherein each of the lugs is formed by two concave curves having external radii of curvature, and two convex curves having internal radii of curvature, in the periphery of the second glass sheet.

7. The pane of claim 6 wherein the internal radii of curvature is between 60 and 300 mm, and the external radii of curvature is between 10 and 250 mm.

8. The pane of claim 4 wherein said lugs each has a length of 10 to 40 mm and a width of 1 to 4 mm.

9. The pane of claim 1 including a functional element positioned between the first and second glass sheets.

10. The pane of claim 1 including a functional element positioned at a portion of the first glass sheet which is not covered by said second glass sheet.

11. A method of producing a pane of laminated glass, comprising the steps of:
    providing a first glass sheet;
    providing a second glass sheet having a surface area smaller than that of said first glass sheet, wherein edges of said first and second glass sheets of the pane lie flush with one another over at least a part of the periphery of the pane, and wherein the edge of the second glass sheet does not over hang the first glass sheet at any point of the periphery;
    positioning at least one insert sheet positioned between said first and second glass sheets to form a laminated pane;
    trimming said insert sheet to the size of the second glass sheet, wherein the edges of said first and second glass sheets of the pane lying flush with one another are formed by lugs extending from said second glass sheet; and
    centering said first and second glass sheets using said lugs.

12. The method of claim 11 including the step of heating said pane so as to shrink said insert sheet.

* * * * *